US009578285B1

(12) United States Patent
Leske et al.

(10) Patent No.: US 9,578,285 B1
(45) Date of Patent: Feb. 21, 2017

(54) FACILITATING PRESENTATIONS DURING VIDEO CONFERENCES

(71) Applicant: Google Inc., Mountain View, CA (US)

(72) Inventors: Matthew John Leske, Stockholm (SE); Christopher Paul David Johnson, Mountain View, CA (US); Hila Shemer, San Francisco, CA (US); Ronald Ho, Fremont, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/466,887

(22) Filed: Aug. 22, 2014

(51) Int. Cl.
H04N 7/15 (2006.01)
G06F 17/24 (2006.01)
G06F 17/21 (2006.01)
H04L 29/06 (2006.01)
H04M 3/56 (2006.01)

(52) U.S. Cl.
CPC .............. H04N 7/15 (2013.01); G06F 17/212 (2013.01); G06F 17/241 (2013.01); H04L 65/60 (2013.01); H04M 3/567 (2013.01)

(58) Field of Classification Search
None
See application file for complete search history.

(56) References Cited

U.S. PATENT DOCUMENTS

| 5,978,835 | A | 11/1999 | Ludwig et al. |
| 6,871,213 | B1 * | 3/2005 | Graham ............ G06F 17/30873 707/E17.111 |
| 7,353,252 | B1 | 4/2008 | Yang et al. |
| 7,461,347 | B2 | 12/2008 | Zhu et al. |
| 8,458,283 | B1 | 6/2013 | Chapweske et al. |
| 8,589,372 | B2 | 11/2013 | Krislov |
| 8,620,879 | B2 | 12/2013 | Cairns |
| 2002/0073163 | A1 * | 6/2002 | Churchill ............... G06Q 10/10 709/214 |
| 2004/0236830 | A1 * | 11/2004 | Nelson .............. H04L 29/06027 709/204 |
| 2009/0231415 | A1 * | 9/2009 | Moore .................... H04N 7/152 348/14.09 |
| 2011/0169910 | A1 * | 7/2011 | Khot ........................ H04N 7/15 348/14.09 |
| 2011/0196928 | A1 * | 8/2011 | Pryhuber ................. H04N 7/15 709/204 |
| 2011/0310216 | A1 * | 12/2011 | Lee .......................... H04N 7/15 348/14.08 |
| 2012/0192084 | A1 * | 7/2012 | Dura ..................... G06F 3/0481 715/751 |
| 2013/0007895 | A1 * | 1/2013 | Brolley .................. G06F 21/62 726/28 |
| 2013/0106989 | A1 | 5/2013 | Gage et al. |
| 2013/0110937 | A1 * | 5/2013 | Burns ................. G06Q 10/103 709/205 |

* cited by examiner

Primary Examiner — Fan Tsang
Assistant Examiner — Jeffrey Lytle
(74) Attorney, Agent, or Firm — IP Spring

(57) ABSTRACT

Implementations generally relate to facilitating presentations in video conferences. In some implementations, a method includes enabling a presenting user to provide a document to a network system. The method further includes enabling the document to be rendered on one or more devices of one or more respective viewing users, where the one or more devices are local to the one or more viewing users. The method further includes enabling the presenting user to navigate the document during a presentation.

20 Claims, 4 Drawing Sheets

FACILITATING PRESENTATIONS DURING VIDEO CONFERENCES

BACKGROUND

Video conferencing is often used in business settings and enables participants to share content with each other in real-time across geographically dispersed locations. A communication device at each location typically uses a video camera and microphone to send video and audio streams, and uses a video monitor and speaker to play received video and audio streams. The communication devices maintain a data linkage via a network and transmit video and audio streams in real-time across the network from one location to another. During a video conference, users often share documents using screen sharing. This involves the sharing client to run a screen sharing application, scrape the video, encode the video, and send the video to all participants who then decode the video.

SUMMARY

Implementations generally relate to facilitating presentations during video conferences. In some implementations, a method includes enabling a presenting user to provide a document to a network system. The method further includes enabling the document to be rendered on one or more devices of one or more respective viewing users, where the one or more devices are local to the one or more viewing users. The method further includes enabling the presenting user to navigate the document during a presentation.

With further regard to the method, in some implementations, the document is presented to the one or more viewing users in a video conference. In some implementations, the document is uploaded to the network system. In some implementations, the document is created in the network system. In some implementations, the document is stored at the network system. In some implementations, the document is stored remotely from the one or more devices. In some implementations, the enabling of the document to be rendered on the one or more devices includes enabling the one or more devices to retrieve information associated with the document. In some implementations, the method further includes causing a portion of the document to be rendered on the one or more devices. In some implementations, the enabling of the presenting user to navigate the document includes sending one or more commands to each of the one or more devices, and where the one or more commands enable the presenting user to navigate the document for the one or more viewing participants. In some implementations, the method further includes enabling one or more viewing participants to provide annotations associated with the document.

In some implementations, a method includes enabling a presenting user to provide a document to a network system. The method further includes enabling the document to be rendered on one or more devices of one or more respective viewing users, where the document is presented to the one or more viewing users in a video conference, where the one or more devices are local to the one or more viewing users, and where the enabling of the document to be rendered on the one or more devices includes enabling the one or more devices to retrieve information associated with the document. The method further includes enabling the presenting user to navigate the document during a presentation, where the enabling of the presenting user to navigate the document includes sending one or more commands to each of the one or more devices, and where the one or more commands enable the presenting user to navigate the document for the one or more viewing participants.

In some implementations, a system includes one or more processors, and logic encoded in one or more tangible media for execution by the one or more processors. When executed, the logic is operable to perform operations including: enabling a presenting user to provide a document to a network system; enabling the document to be rendered on one or more devices of one or more respective viewing users, where the one or more devices are local to the one or more viewing users; and enabling the presenting user to navigate the document during a presentation.

With further regard to the system, in some implementations, the document is presented to the one or more viewing users in a video conference. In some implementations, the document is uploaded to the network system. In some implementations, the document is created in the network system. In some implementations, the document is stored at the network system. In some implementations, the document is stored remotely from the one or more devices. In some implementations, to enable the document to be rendered on the one or more devices, the logic when executed is further operable to perform operations including enabling the one or more devices to retrieve information associated with the document. In some implementations, the logic when executed is further operable to perform operations including causing a portion of the document to be rendered on the one or more devices. In some implementations, to enable the presenting user to navigate the document, the logic when executed is further operable to perform operations including sending one or more commands to each of the one or more devices, and where the one or more commands enable the presenting user to navigate the document for the one or more viewing participants.

DETAILED DESCRIPTION

Implementations described herein facilitate presentations during video conferences. In various implementations, a system enables a presenting user to provide a document to the system. The document may be any type of document, such as a text document, a spreadsheet, etc. In various implementations, to provide a document to the system, the system enables the presenting user to upload the document to the system or to create the document in the system.

During a video conference, the system enables the document to be rendered on one or more devices of one or more respective viewing users who are also participating in the video conference, where the one or more devices are local to the viewing users. In some implementations, the document is stored at the system, remotely from the devices of the viewing users. In some implementations, the enabling of the document to be rendered on the devices includes enabling the devices to retrieve information associated with the document. In some implementations, the system causes a portion of a given document to be rendered on the devices.

In various implementations, the system enables the presenting user to navigate the document during a presentation. For example, the presenting user may scroll up and down the document, where the viewing users can view the document being scrolled. In some implementations, the enabling of the presenting user to navigate the document includes sending one or more commands to each of the one or more devices, and where the one or more commands enable the presenting user to navigate the document for the one or more viewing participants. In some implementations, the system enables one or more viewing participants to provide annotations associated with the document.

Figure 1:
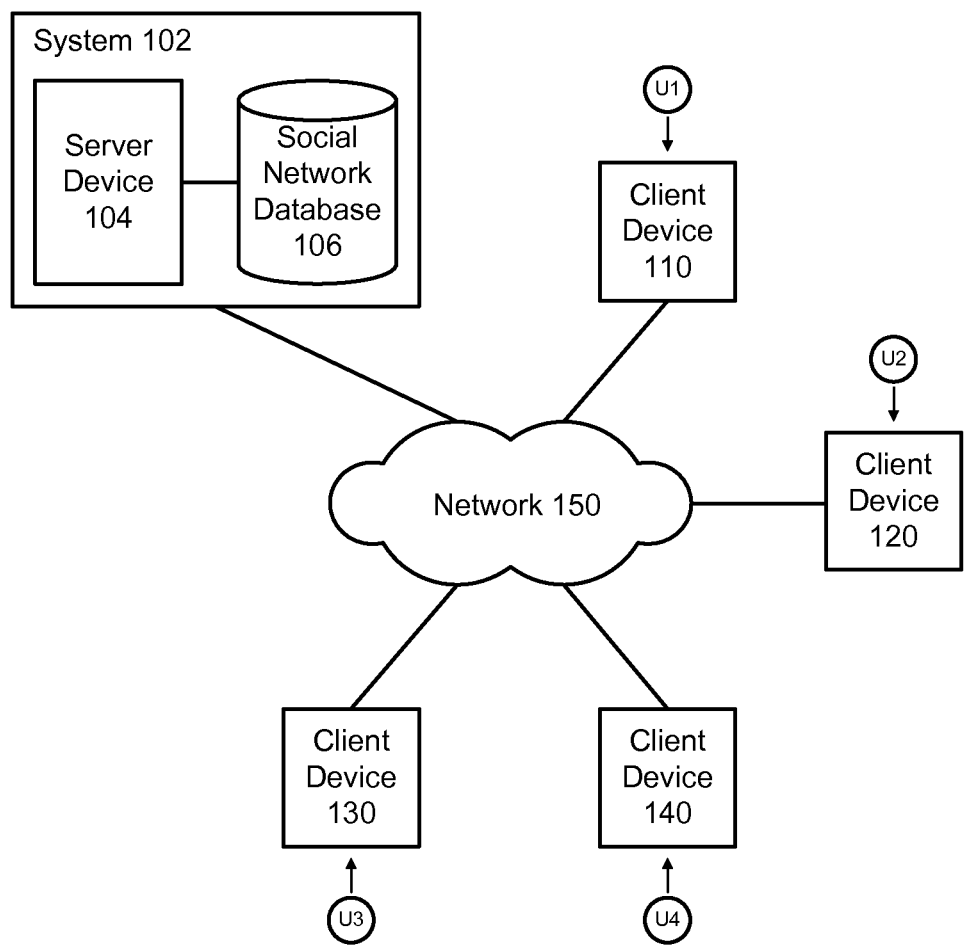
FIG. 1 illustrates a block diagram of an example network environment, which may be used to implement the implementations described herein.

FIG. 1 illustrates a block diagram of an example network environment 100, which may be used to implement the implementations described herein. In some implementations, network environment 100 includes a system 102, which includes a server device 104 and a social network database 106. In various implementations, the term system 102 and phrase "social network system" may be used interchangeably. Network environment 100 also includes client devices 110, 120, 130, and 140, which may communicate with each other via system 102. Network environment 100 also includes a network 150.

For ease of illustration, FIG. 1 shows one block for each of system 102, server device 104, and social network database 106, and shows four blocks for client devices 110, 120, 130, and 140. Blocks 102, 104, and 106 may represent multiple systems, server devices, and social network databases. Also, there may be any number of client devices. In other implementations, network environment 100 may not have all of the components shown and/or may have other elements including other types of elements instead of, or in addition to, those shown herein.

In various implementations, users U1, U2, U3, and U4 may communicate with each other using respective client devices 110, 120, 130, and 140. For example, users U1, U2, U3, and U4 may interact with each other in a multi-user video conference, where respective client devices 110, 120, 130, and 140 transmit media streams to each other.

In the various implementations described herein, the processor of system 102 causes the elements described herein (e.g., video streams, documents, etc.) to be displayed in a user interface on one or more display screens.

Figure 2:
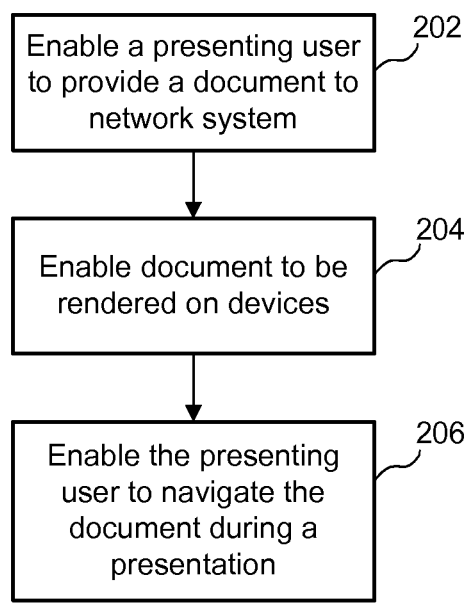
FIG. 2 illustrates an example simplified flow diagram for facilitating presentations during video conferences, according to some implementations.

FIG. 2 illustrates an example simplified flow diagram for facilitating presentations in video conferences, according to some implementations. Referring to both FIGS. 1 and 2, a method is initiated in block 202, where system 102 enables a presenting user to provide a document to a network system (e.g., system 102). In various implementations, system 102 enables the presenter to provide the document in various ways. For example, in some implementations, the document is uploaded to the network system. The presenting user may upload the document from any suitable device (e.g., tablet, laptop, desktop, etc.) to system 102 prior to the video conference or during the video conference.

In some implementations, system 102 may enable the document to be created in the cloud. For example, system 102 may enable the presenting user to create the document in system 102. Such a document may be created and maintained in the cloud, at system 102. As such, the document may be referred to as a cloud-based document.

For ease of illustration, some implementations are described herein in the context of a single document. These implementations and others also apply to multiple documents. For example, the presenting user may present/share multiple documents to other video conference participants at different points during the video conference.

In some implementations, the document is stored at system 102 during the video conference. For example, in some implementations, system 102 may enable the presenting user to upload or create one or more documents to be presented before the video conference or during the video conference. As such, during the video conference, the document is already stored and ready to be accessed by the viewing users. In other words, the document being stored at system 102 is stored remotely from the devices of the viewing users.

As described in more detail below, in various implementations, once system 102 has stored the document, system 102 enables the presenting user to indicate the document as well as particular portions of the given document to present.

In block 204, system 102 enables the document to be rendered on one or more devices of one or more respective viewing users, where the one or more devices are local to the one or more respective viewing users. In various implementations, the document is presented to the one or more viewing users during the video conference.

Figure 3:
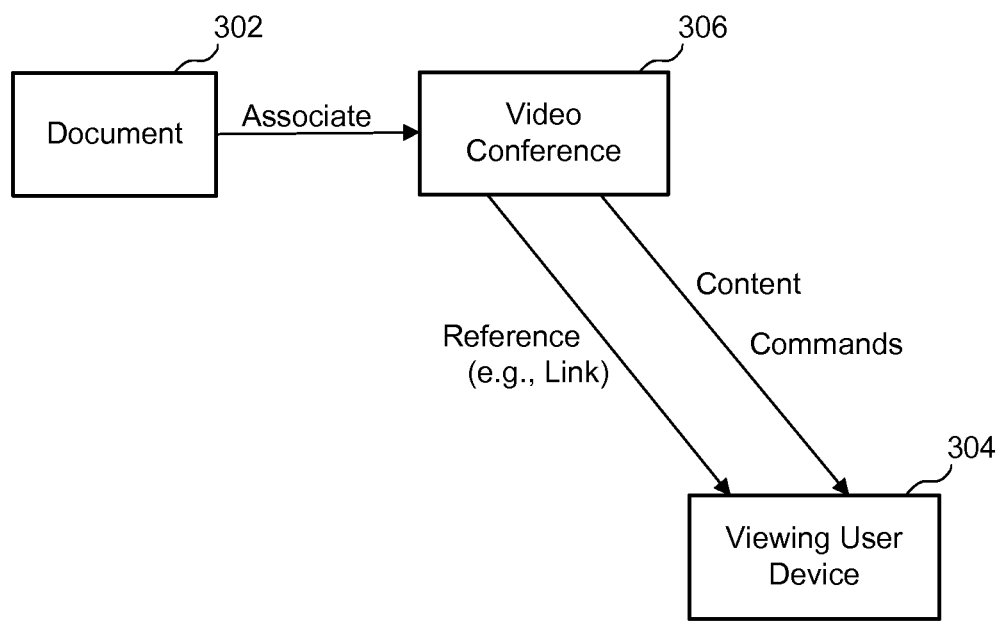
FIG. 3 illustrates an example flow of information, according to some implementations.

FIG. 3 illustrates an example flow 300 of information, according to some implementations. As shown in FIG. 3, in some implementations, to enable a document 302 provided by a presenting user (e.g., users U1) to be rendered on a viewing user device 304 of a viewing user (e.g., user U2), system 102 associates document 302 with video conference 306.

In an example scenario, system 102 may provide a selector control to the presenting user U1. System 102 may then enable the presenting user U1 to select a particular document (e.g., document 302) to be associated with video conference 306. As indicated above, document 302 may have been previously uploaded to system 102 or may be a cloud-based document. As a result of the user selection, document 302 is associated with video conference 306.

For ease of illustration, some implementations are described herein in the context of a device of a single viewing user. These implementations and others also apply to multiple documents and to multiple viewing users. For example, viewing user device 304 of FIG. 3 may represent multiple devices of multiple corresponding viewing users participating in the video conference.

In some implementations, to enable document 302 to be rendered on viewing user device 304 of viewing user U2, system 102 enables viewing user device 304 to retrieve and receive information associated with document 302. In various implementations, system 102 sends a small amount of information to the viewing user device 304 of viewing user U2. For example, in some implementations, the information may include a reference or a link to the document. The link may be a uniform resource locator (URL), for example. System 102 may send the reference to viewing user device 304 at different times, depending on the implementations. For example, system 102 may send the reference before the video conference (e.g., in a meeting invitation). System 102 may also send the reference during the video conferment. For example, the presenting user may associate document 302 with video conference 306 after it has already started.

In various implementations, the information also includes content/data for the viewing users to view during the video conference. For example, such content may include text, images, spreadsheets, etc. In some implementations, the information may also include formatting information. In other words, the devices of the viewing users do not download and process the actual document or receive a video feed with the content of document. Instead, the viewing user device 304 retrieves the content, including formatting information, from system 102 and render the content locally. In some implementations, viewing users receive information for rendering the presenting viewer's document. In some implementations, system 102 may leave out some or all formatting in order to reduce the amount of data being transferred and processed.

In some implementations, the information may also include commands. As described in more detail below, such commands may enable the devices of the viewing users to render a given document in a particular way. For example, the devices of the viewing users may cause content to be scrolled as the presenting user navigates the documents, zoom in or out of the document, etc.

In various implementations, each different device accesses the document, then requests the associated information (e.g., content, formatting information, commands, etc.), and then automatically renders the document to the appropriate screen size for that particular device. For example, whether the device is a smartphone, tablet, laptop, desktop, conference room device, etc., the device will render the content accordingly and appropriately.

In various implementations, system 102 provides permission to particular viewing users to access and view the document. Such permission may be based on a conference invitee or participant list that is created when the video conference is setup. Any device that the viewing user uses to join the meeting would be permitted to request and receive any information associated with the document. In various implementations, any suitable authentication process may be used to enable the viewing user to initially join the meeting using a particular device. In various implementations, system 102 may enable the participant list to change dynamically before and during the video conference. In other words, participants may be added to the participant list or removed from the participant list before and during the video conference.

In some implementations, system 102 may cause a portion of the document to be rendered on the one or more devices. As indicated above, in various implementations, after system 102 has stored a given document, system 102 enables the presenting user to indicate a particular portion of the document to present to the other users. For example, system 102 may enable the presenting user to present the current page or a particular portion of the document to present.

For ease of illustration, some implementations are described herein in the context of a single presenting user. These implementations and others also apply to each participant in the video conference. For example, a first participant may be a presenting user with respect to a first document, and that same first participant may be a viewing user with respect to a second document. In another example, that same first participant may be a viewing user with respect to a second document, where a second participant may be the presenting user with respect the second document. In other words, there may be multiple presenters in a given video conference.

In block 206, system 102 enables the presenting user to navigate the document during a presentation. In some implementations, the enabling of the presenting user to navigate the document includes sending one or more commands to each of the one or more devices, and where the one or more commands enable the presenting user to navigate the document for the one or more viewing participants.

For example, in various implementations, such commands may cause a given device to take one or more predetermined actions. Such predetermined actions may include scroll up or down, going to the next page, going to the previous page, move down L lines, move up L lines, highlighting particular content such as text, etc. In various implementations, documents are not limited to readable text, and may also include pre-recorded audio or video. The commands executed at the devices of the viewing users may be the same commands that the presenting user executes as the presenting user navigates the document. For example, if the device of the presenting user sends a command to move down 3 lines, system 102 sends the same command to each of the devices of the viewing users, which in turn navigate the content rendered locally at those devices. As a result, the viewing user sees what the presenting user is doing. The presenting user controls the flow of the document and what is being presented.

In various implementations, the commands may also include various commands to indicate what portion of the document to focus on. For example, a command may cause an indicator such as a cursor to appear on the screen. A command may control slide changes if the content renders slides.

In some implementations, system 102 enables the presenting user and/or one or more viewing participants to provide annotations associated with the document. This would be beneficial in a situation where a given viewing user has a question and wants to highlight a portion of the text related to the question. For example, the user may have a tablet and want to circle part of the document or write something on the document. In various implementations, such annotations are be created locally at the device of the particular viewing user, and system 102 sends commands to the devices of the other users in order to cause those devices to render the same annotations. In some implementations, multiple users can provide different annotations to the same document. In some implementations, the actual document stored at system 102 does not change from the annotation, but, rather, each device renders the annotations locally when rendering the document locally at each device. In various implementations, system 102 may save/record any annotations provided by any of the users, where versions of the document with the annotations are accessible to the participants during and after the video conference. In some implementations, system 102 may associate metadata with a viewing user's question or annotation. For example, such metadata may include which viewing user made the annotation or question it is (e.g., user U2's question).

Sending commands is much more efficient than capturing content in video, sending the video to the receiving device at the endpoint, and having the receiving device render the entire video. Sending commands is much more efficient in terms of presenter bandwidth, processing and battery consumption, and also creates a higher quality presentation at each endpoint.

Implementations described herein provide various benefits. For example, implementations facilitate the sharing of documents during video conferences. Implementations enable each video endpoint in a video conference to render documents that are stored in the cloud, where each endpoint can retrieve the source document directly and render the content during the video conference. Implementations reduce presenter bandwidth, processing, and battery consumption. Implementations also create a higher quality presentation for each endpoint.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

While system 102 is described as performing the steps as described in the implementations herein, any suitable component or combination of components of system 102 or any suitable processor or processors associated with system 102 may perform the steps described.

Figure 4:
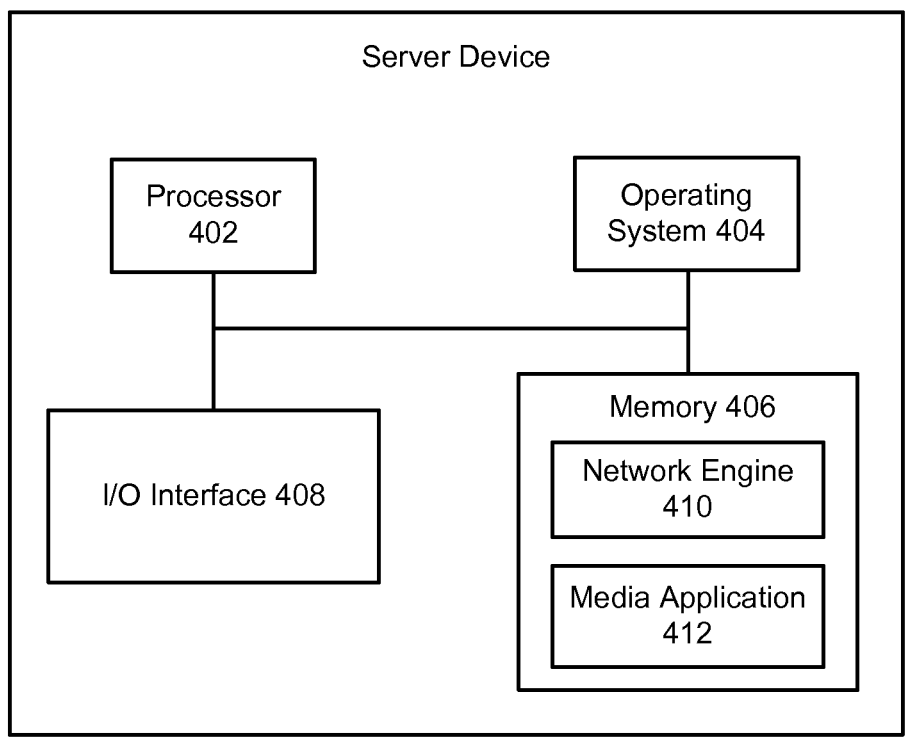
FIG. 4 illustrates a block diagram of an example server device, which may be used to implement the implementations described herein.

FIG. 4 illustrates a block diagram of an example server device 400, which may be used to implement the implementations described herein. For example, server device 400 may be used to implement server device 104 of FIG. 1, as well as to perform the method implementations described herein. In some implementations, server device 400 includes a processor 402, an operating system 404, a memory 406, and an input/output (I/O) interface 408. Server device 400 also includes a network engine 410 and a media application 412, which may be stored in memory 406 or on any other suitable storage location or computer-readable medium. Media application 412 provides instructions that enable processor 402 to perform the functions described herein and other functions.

For ease of illustration, FIG. 4 shows one block for each of processor 402, operating system 404, memory 406, I/O interface 408, network engine 410, and media application 412. These blocks 402, 404, 406, 408, 410, and 412 may represent multiple processors, operating systems, memories, I/O interfaces, network engines, and media applications. In other implementations, server device 400 may not have all of the components shown and/or may have other elements including other types of elements instead of, or in addition to, those shown herein.

Although the description has been described with respect to particular embodiments thereof, these particular embodiments are merely illustrative, and not restrictive. Concepts illustrated in the examples may be applied to other examples and implementations. For example, some implementations are described herein in the context of a social network system. However, the implementations described herein may apply in contexts other than a social network.

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions for execution by the processor. For example, a tangible medium such as a hardware storage device can be used to store the control logic, which can include executable instructions. The software instructions can also be contained in, and provided as, an electronic signal, for example in the form of software as a service (SaaS) delivered from a server (e.g., a distributed system and/or a cloud computing system).

What is claimed is:

1. A computer-implemented method comprising:
receiving a document in a network system;
sending document content and first formatting information associated with the document to a first device of at least a first viewing user, wherein the document content and the first formatting information are configured to enable the first device to locally render representation of the document on a display screen of the first device during a video conference;
sending the document content and second formatting information to a second device of at least a second viewing user wherein the document content and the second formatting information are configured to enable the second device to locally render representation of the document on a display screen of the second device in the video conference, wherein at least a portion of the first formatting information and the second formatting information are different; and
sending one or more first commands to the first device and sending one or more second commands to the second device, wherein the one or more first commands and the one or more second commands are configured to enable a presenting user of the video conference to navigate locally rendered and respectively formatted representations of the document for the first viewing user and second viewing user at a same time during the video conference such that at least a portion of the document content locally rendered according to the first formatting information on the first device is the same as the document content locally rendered according to the second formatting information on the second device.

2. The method of claim 1, wherein the first formatting information is specific for the first device and the second formatting information is specific for the second device.

3. The method of claim 1, wherein the first formatting information represents less than original formatting information of the document.

4. The method of claim 1, wherein the document content retrieved by one of the first device and the second device is for a portion of the document, and wherein the representation of the document for the respective one of the first and the second device represents the portion of the document.

5. The method of claim 1, wherein the one or more commands sent to the first device and the second device correspond to presenter navigation commands that the presenting user executes on a presenting device as the presenting user navigates the document.

6. A computer-implemented method for facilitating presentation of a document in a network system, the method comprising:

enabling a representation of the document to be rendered locally on a display screen of each of a first device and a second device of one or more respective viewing users by enabling the first device to retrieve document content and first formatting information associated with the document and enabling the second device to retrieve the document content and second formatting information, wherein at least a portion of the first formatting information and the second formatting information are different, and wherein the representation of the document is rendered by the first device based on the retrieved document content and the retrieved first formatting information and rendered by the second device based on the retrieved document content and the retrieved second formatting information; and enabling respectively formatted representations of the document locally rendered on the first and second devices to be navigated at a same time on the respective display screens according to one or more first commands for the first device and one or more second commands for the second device sent by a device controlled by a presenting user during a presentation such that at least a portion of the document content locally rendered according to the first formatting information on the first device is the same as the document content locally rendered according to the second formatting information on the second device.

7. The method of claim 6, wherein the first formatting information is specific for the first device and the second formatting information is specific for the second device.

8. The method of claim 6, wherein enabling the representation of the document to be rendered on the display screen of the first device and the second device does not include enabling the first device and the second device to download the document.

9. The method of claim 6, wherein enabling the representation of the document to be rendered on the display screen of the first device and the second device excludes providing a video feed with the document to the first device and the second device.

10. The method of claim 6, wherein the document content retrieved by one of the first device and the second device is for a portion of the document, and wherein the representation of the document for the respective one of the first and the second device represents the portion of the document.

11. The method of claim 6, wherein enabling the representation of the document for the respective ones of the first and the second devices to be navigated comprises wherein the one or more first commands for the first device and the one or more second commands for the second device respectively cause the first device and the second device to take one or more predetermined navigation actions.

12. The method of claim 11, wherein the one or more commands sent to the first device and the second device correspond to presenter navigation commands that the presenting user executes on a presenting device as the presenting user navigates the document.

13. The method of claim 6, further comprising enabling the first viewing user of the one or more viewing users to annotate the representation of the document for the first device, wherein the first user device of the first user sends at least one annotation command to the second device, and wherein the at least one annotation command causes the second device to annotate the representation of the document for the second device.

14. The method of claim 6, wherein the first formatting information represents less than original formatting information of the document.

15. A system comprising:

one or more processors; and logic encoded in one or more tangible non-transitory media for execution by the one or more processors and when executed operable to perform operations for facilitating presentation of a document in a network system, the operations comprising:

enabling a representation of the document to be rendered locally on a display screen of each of a first device and a second device of one or more respective viewing users by enabling the first device to retrieve document content and first formatting information associated with the document and enabling the second device to retrieve the document content and second formatting information, wherein at least a portion of the first formatting information and the second formatting information are different, and wherein the representation of the document is rendered by the first device based on the retrieved document content and the retrieved first formatting information and rendered by the second device based on the retrieved document content and the retrieved second formatting information; and enabling respectively formatted representations of the document locally rendered on the first and second devices to be navigated at a same time on the respective display screens according to one or more first commands for the first device and one or more second commands for the second device sent by a device controlled by a presenting user during a presentation such that at least a portion of the document content locally rendered according to the first formatting information on the first device is the same as the document content locally rendered according to the second formatting information on the second device.

16. The system of claim 15, wherein the first formatting information is specific for the first device and the second formatting information is specific for the second device.

17. The system of claim 15, wherein enabling the representation of the document to be rendered on the first device and the second device of one or more respective viewing users does not include enabling the first device and the second device to download the document.

18. The system of claim 15, enabling the representation of the document to be rendered on the first device and the second device of the one or more respective viewing users excludes providing a video feed with the document to the first device and the second device.

19. The system of claim 15, wherein the document content retrieved by one of the first device and the second device is for a portion of the document and the representation of the document for the respective one of the first and the second device represents the portion of the document.

20. The system of claim 15, wherein, to enable the presenting user to navigate respectively formatted representations of the document for the respective ones of the first and the second devices, the logic when executed is further operable to perform operations comprising wherein the one or more first commands for the first device and the one or more second commands for the second device respectively cause the first device and the second device to take one or more predetermined navigation actions.

* * * * *